Jan. 16, 1940.   R. STEIN   2,186,998
KITCHEN SINK
Filed June 6, 1938

INVENTOR.
ROSE STEIN
BY
ATTORNEY.

Patented Jan. 16, 1940

2,186,998

UNITED STATES PATENT OFFICE 2,186,998

KITCHEN SINK

Rose Stein, Los Angeles, Calif.

Application June 6, 1938, Serial No. 211,988

7 Claims. (Cl. 4—291)

This invention relates to kitchen sinks and the like and it has for its object to provide a sanitary and convenient kitchen sink in which vegetables, fruit and the like may be prepared for cooking or table use, as by washing, paring, coring and like processes, and in which the refuse, such as parings and garbage may be retained until it becomes convenient to remove the same.

In accordance with the invention, and in the preferred practice thereof, I provide a kitchen sink of somewhat the conventional rectangular form in general use, but having a deep bowl-like depression in its bottom wall; this bowl-like recess may be plugged or stopped at its bottom outlet where it is connected to the drain pipe by any suitable outlet controlling means; a receptacles having an apertured wall and generally conforming to the interior space of the recess is seated therein; dishes and other articles may be conveniently washed and rinsed by placing the same in the receptacle; and vegetables and the like placed in the receptacle may be washed therein; and the parings and refuse therefrom may be temporarily allowed to remain in the receptacle (that is until it becomes convenient to remove them to the garbage can or other place of garbage disposal); a combined receptacle-carrier, drip pan and straining closure having drainage openings at or near its marginal edge and a continuous wall disposed inwardly of its marginal edge normally closes the mouth of the bowl-like recess and is seated in a rabbeted portion of the sink bottom wall surrounding the recess and with the wall depending thereto. When it becomes desirable to dump the garbage in the receptacle, the receptacle, having been already drained of the contained water, is placed upon the inverted closure with its bottom portion enclosed by the now upstanding wall, and all further drainage or drip is caught by the drip pan so provided as the garbage is carried out. When the closure is seated in its normal position in the general plane of the sink bottom, and at a low point therein, it acts as does the usual sink strainer interposed between the interior space of a sink basin and its drain pipe or trap, water passing to the drain through the openings and solid bodies being retained in the basin.

In sinks as ordinarily constructed pans and the like must be used for the washing of dishes or vegetables and parings removed by placing the same in other pans, all of which results in great inconvenience and necessitates the expenditure of a great amount of labor; and furthermore, usually a dirty, unsanitary and littered sink results.

It is therefore a further object of the invention to provide a sanitary sink which will eliminate all dishpans, vegetable pans, paring and refuse pans, strainers, and like utensils, and in which all the usual work may be done, in a more sanitary and satisfactory manner than by the use of such pans and other utensils.

With the above and other objects in view, including the provision of a kitchen sink of the general nature above outlined which will be simple and inexpensive in construction and organization, convenient and clean in use, and generally superior in serviceability, the invention consists in the novel and useful provision, formation, combination, association and inter-relation of parts, members and features, all as hereinafter described, shown in the drawing, and finally pointed out in claims.

Figures 1, 2, 3, 4:
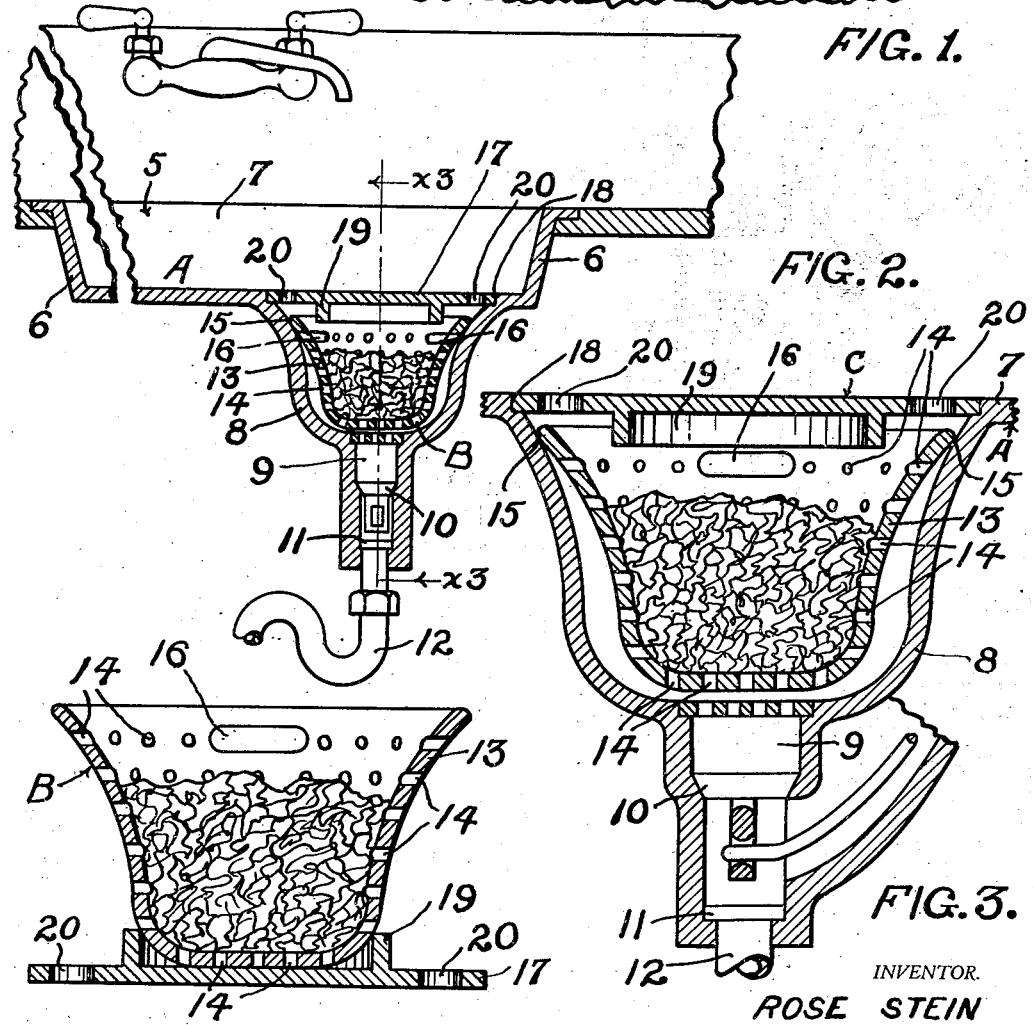
Figure 1 is a plain view of a sanitary kitchen sink constructed and organized to embody the invention.
Figure 2 is a vertical central longitudinal sectional detail view of the sink shown in Figure 1, the view being taken on the line X2—X2, Figure 1.

Figure 3 is an enlarged view of parts shown in Figure 2, but taken at right angles thereto, as on line X3—X3 thereof; and Figure 4 is an enlarged fragmentary view in section showing the closure or carrier inverted and removed from its normal position, as shown in Figures 1 and 2, and as having the receptacle (also in removed or detached position) seated thereon, this view illustrating how the drip from the parings or garbage is caught, as the receptacle is carried to the place of garbage disposal.

Corresponding parts in the several figures are designated by the same reference characters.

Referring with particularity to the drawing, in the embodiment of the invention therein shown, A designates, generally, a sink constructed and organized to embody the invention, B designates a straining receptacle for dishes, vegetables, parings, and the like, and C designates a combined invertible straining closure and receptacle carrier adapted to catch the drip from the receptacle when the same is properly positioned thereupon.

The sink A is shown as comprising a body 5, formed of suitable material, such for instance as iron or steel, enameled, porcelain or like substance, and as having end walls 6, side walls 7, and a relatively flat, though inclined, bottom wall 7; this bottom wall 7 is formed at its lowest point with a well or bowl 8, at the bottom outlet 9, of which any suitable plugging or flow-controlling device, such as the plug 10 is provided, as will be understood by those skilled in the art.

The bowl 8, is especially well adapted for the washing of dishes, washing and paring of vegetables and the like, and like purposes, so eliminating the use of pans, strainers and the like, the flow of water from the bowl being controlled at the outlet 11, which is connected to a drain trap 12, by means of the plug 10, a sanitary integral washing space is provided by the bowl.

The receptacle B is shown as a cage or bowl-like straining device having a body 13, of sheet metal or like material, perforated as at 14, and conforming generally to the contour of the inner wall surfaces of the bowl 8, in which the same is normally seated as at 15; dishes placed in this receptacle may, when the same is in normal position, be washed and rinsed, and then removed by lifting out the receptacle, finger openings being provided at diametrically opposite points to that end, as at 16.

The carrier C, which is adapted for the triple function of serving (a) as a closure plate to cover any parings or garbage left in the receptable B, (b) as a sink-bottom strainer, and (c) as a drip-catching carrier (when inverted) upon or into which the bottom of the receptacle B fits, may comprise a circular plate 17 fitted into a rabbeted formation 18, provided in the sink bottom, and provided with a normally depending circular wall 19, which when the closure is used as a tray or carrier (in inverted position) serves to form, in conjunction with the central portion 19 of the plate, a drip pan, formed to retain the receptacle B, when properly seated thereupon; outwardly of this wall 19, the plate 17 is apertured, as at 20, to allow water to pass, and to retain such solid matter as would tend to clog the drain pipe.

The method of use and advantages of the invention will be readily understood from the foregoing description.

I do not desire to be understood as limiting myself to the specific disclosure herein, but reserve the right, in practicing the invention, to vary from the same, both with respect to the form of the sink and the parts thereof, as well as the mode of and purposes in use and practice.

Having thus disclosed my invention, I claim and desire to secure by Letters Patent:

1. A sanitary kitchen sink of the character disclosed in which garbage may be temporarily retained comprising a basin having an upstanding peripheral wall and a bottom, said bottom having a relatively deep and capacious bowl-like recess at one portion thereof, the wall of said recess being perforated for communication with a trap, a perforated straining receptacle seated in said recess and adapted to pass the liquid of its contents through the perforations of said recess wall and a perforated straining closure member seated to cover said recess and its contents; said closure member comprising a reversible plate having an endless wall disposed inwardly of its marginal periphery to form a catch basin, and having its perforations disposed outwardly of said wall.

2. A sanitary kitchen sink of the character disclosed adapted to greatly facilitate the paring and like preparation of vegetables and other foods and the washing of dishes comprising an elongated rectangular basin having a relatively flat bottom interrupted by a bowl-like depression, said bowl-like depression having draining perforations at its bottom to provide a strainer, a drain connection at said perforations, a perforated receptacle adapted to contain dishes, parings or the like disposed in said depression, and a combined closure and receptacle-carrier normally closing said depression; said carrier comprising, in integral construction, a plate having an outstanding continuous wall which when said plate is inverted forms together with the imperforate enclosed plate portion a drip catcher; and said plate having drain openings therein outwardly of said wall and normally closing said depression with said wall depending therein, so concealing the contents of said receptacle.

3. A sanitary dishwashing and garbage disposal kitchen sink of the character disclosed having a bowl-like dishwashing basin in its bottom wall, straining openings at the bottom of said basin, means for retaining water in said basin or controlling the discharge of the same therefrom, a perforated receptacle fitted into said basin and adapted to contain dishes, vegetables, parings and the like, and a combined covering, straining and drip-catching carrier normally covering said basin; said carrier being normally seated at its periphery in said basin and having a depending continuous wall and a plurality of drain openings disposed outwardly of said wall; said wall together with the central imperforate portion of the carrier forming a drip catcher when the carrier is inverted and the perforated receptacle with its contents are placed thereupon for transportation and like purposes.

4. A sanitary kitchen sink of the character disclosed adapted for washing dishes without the customary dish pan and adapted for the temporary storage of garbage comprising an elongated rectangular relatively shallow basin having end and side walls and a relatively flat bottom wall, said bottom wall being formed integrally at one portion thereof with a deep bowl, a water outlet at the bottom of said bowl, means for controlling the flow from said outlet, a draining receptacle seated in said bowl and conforming to the same, and a removable receptacle carrier normally closing said bowl and lying in the general plane of the sink bottom wall; said bottom wall having an annular recessed seat into which said carrier is fitted; and said carrier comprising a flat disc having a circular depending wall disposed inwardly of its periphery and a plurality of drain apertures disposed outwardly of said wall; and said carrier when overturned being adapted to have said receptacle seated therein and to act as a drip pan while garbage in said receptacle is being carried to a place of disposal.

5. A kitchen sink of the character disclosed in which dishes may be washed or garbage may be temporarily retained comprising a basin having an upstanding peripheral wall and having a relatively deep and capacious bowl-like recess at its bottom, said recess being formed to serve as a dish-washing receptacle, a container for parings and the like disposed in said recess, an invertible closure for said recess, and means for controlling the flow of water from said recess; said closure being formed to act as a carrier for said container when in detached and inverted position.

6. A sanitary kitchen sink of the character disclosed having a relatively deep and capacious bowl-like recess at its bottom portion, said recess adapting said sink for dishwashing and garbage retention purposes, an outlet at the lower portion of said recess, means for controlling the discharge of water at said outlet, a receptacle for garbage normally housed in said recess, and a removable straining closure normally seated to close said recess and formed to act as a carrier co-acting with said receptacle when in detached position.

7. A sanitary kitchen sink having a peripheral wall and a relatively deep and capacious bowl-like dish-washing recess, said recess being disposed at the bottom portion of said sink and having a discharge outlet, a valve for controlling the discharge of water at said outlet, means for controlling said valve, a perforated receptacle normally disposed and housed in said recess and adapted for washing vegetables and the like and to temporarily retain garbage, and a removable apertured closure normally seated over and closing said recess.

ROSE STEIN.